United States Patent [19]
van den Top

[11] Patent Number: 4,901,471
[45] Date of Patent: Feb. 20, 1990

[54] APPARATUS FOR CULTIVATING MARKET GARDEN PRODUCTS, PARTICULARLY MUSHROOMS

[76] Inventor: Hendrik van den Top, Bellstraat 19, 3771 AH Barneveld, Netherlands

[21] Appl. No.: 193,763

[22] Filed: May 13, 1988

[30] Foreign Application Priority Data

May 22, 1987 [NL] Netherlands ............... 8701239

[51] Int. Cl.⁴ .................................. A01G 1/04
[52] U.S. Cl. ........................... 47/1.1; 47/18; 414/268; 414/278
[58] Field of Search ............... 47/1.1, 58, 18; 414/268, 276, 278, 279, 281, 282, 284, 288, 285, 291

[56] References Cited

U.S. PATENT DOCUMENTS

| | | | |
|---|---|---|---|
| 3,832,802 | 9/1974 | Huys et al. | 47/1.1 |
| 4,016,986 | 4/1977 | Thomas | 414/282 |

FOREIGN PATENT DOCUMENTS

| | | | |
|---|---|---|---|
| 0154172 | 9/1985 | European Pat. Off. | 414/268 |
| 0154667 | 9/1985 | European Pat. Off. | 414/268 |
| 596765 | 8/1959 | Italy | 414/278 |
| 0222907 | 9/1987 | Japan | 414/268 |
| 8003088 | 1/1982 | Netherlands | 47/1.1 |
| 8105823 | 7/1983 | Netherlands | 47/1.1 |

Primary Examiner—James R. Feyrer
Attorney, Agent, or Firm—Watson, Cole, Grindle & Watson

[57] ABSTRACT

Apparatus for cultivating for example mushrooms, whereby a desired climate is preserved in a building. Disposed in the building standing parallel to each other are racks in which trays are placed in which the mushrooms are cultivated. Arranged in the passage between the racks and horizontally along them are rails which can be driven synchronously in vertical direction. A platform can travel over the rails. The platform can therefore be carried to any required position along the racks. Personnel can take up position on the platform, for instance to pick the mushrooms. Further coupled to the rails is a belt conveyor which carries away the picked mushrooms.

11 Claims, 3 Drawing Sheets

APPARATUS FOR CULTIVATING MARKET GARDEN PRODUCTS, PARTICULARLY MUSHROOMS

The invention relates to an apparatus for cultivating market garden products such as mushrooms.

Such an apparatus is known from U.S.-A-3.832.802.

In the case of this known system the trays are moved out of the rooms onto a mobile scaffolding frame and then, after the trays have, if required, been carried downward, the mushrooms are harvested. This is a very roundabout method. In the first place the frame has to be moved into position in front of a rack, the rails for guiding the trays during sliding out of the room then have to be positioned accurately at the height of a tray, following which the tray has to be run out of the room onto the rails and finally the rails with tray have to be transported downward.

It is the object of the invention to improve the apparatus as described such as to enable a higher picking productivity and a more agreeable manner of working. This is achieved in accordance with the invention by providing horizontal guide means along a pair of horizontally spaced and opposed racks, the horizontal guide means being vertically movable along vertical guide means spaced lengthwise along the racks.

As a result of these steps it is possible to position a horizontal guiding at any desired height vertically along the rack, whereby personnel can reach each tray in the rack easily and safely standing on the work platform.

In preference the a frame is carried by the horizontal guide means for supporting a belt conveyor, and drive means is provided for raising and lowering the guide means synchronously. It becomes possible as a result to displace the belt conveyor synchronously with the work platform and to place the harvested mushrooms on the belt conveyor. In the case of an apparatus with racks placed facing one another the a drive means is connected to the horizontal guide means by cables trained over pulleys. The work platform can here support on parallel lying rails, so that it can travel between the racks.

The vertical guide means preferably comprises vertically extending U-shaped beams, and each horizontal guide means is releasably connected by coupling means to a frame portion guided in a vertically extending beam. The drive means in the form of a motor are preferably controlled from the work platform by remote control or via a cable.

Use of the step as claimed in claim 6 enables disconnection of the guiding.

Further advantages and features of the invention will become apparent from the description of the annexed drawings, in which.

Figure 1:
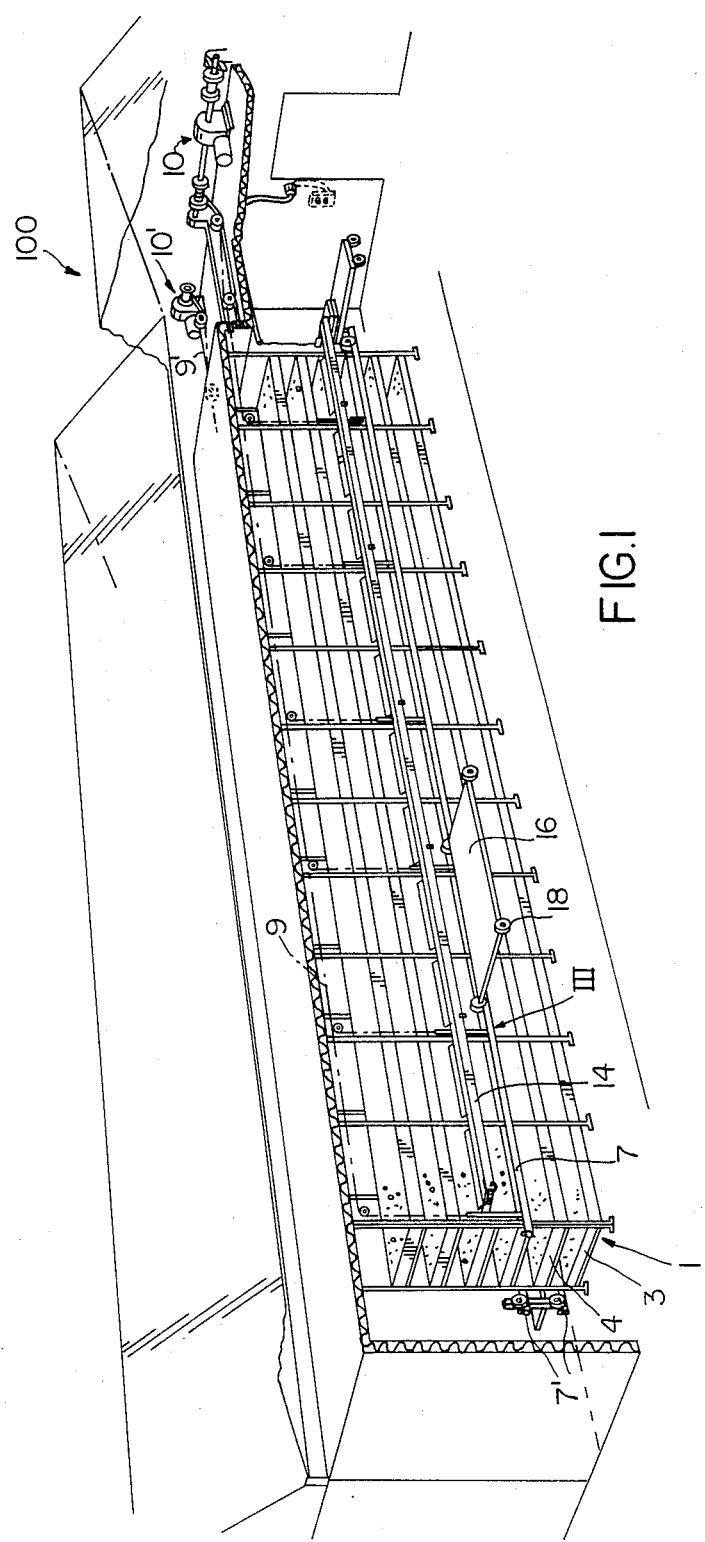
FIG. 1 shows a perspective view of an apparatus according to the invention.
Figure 2:
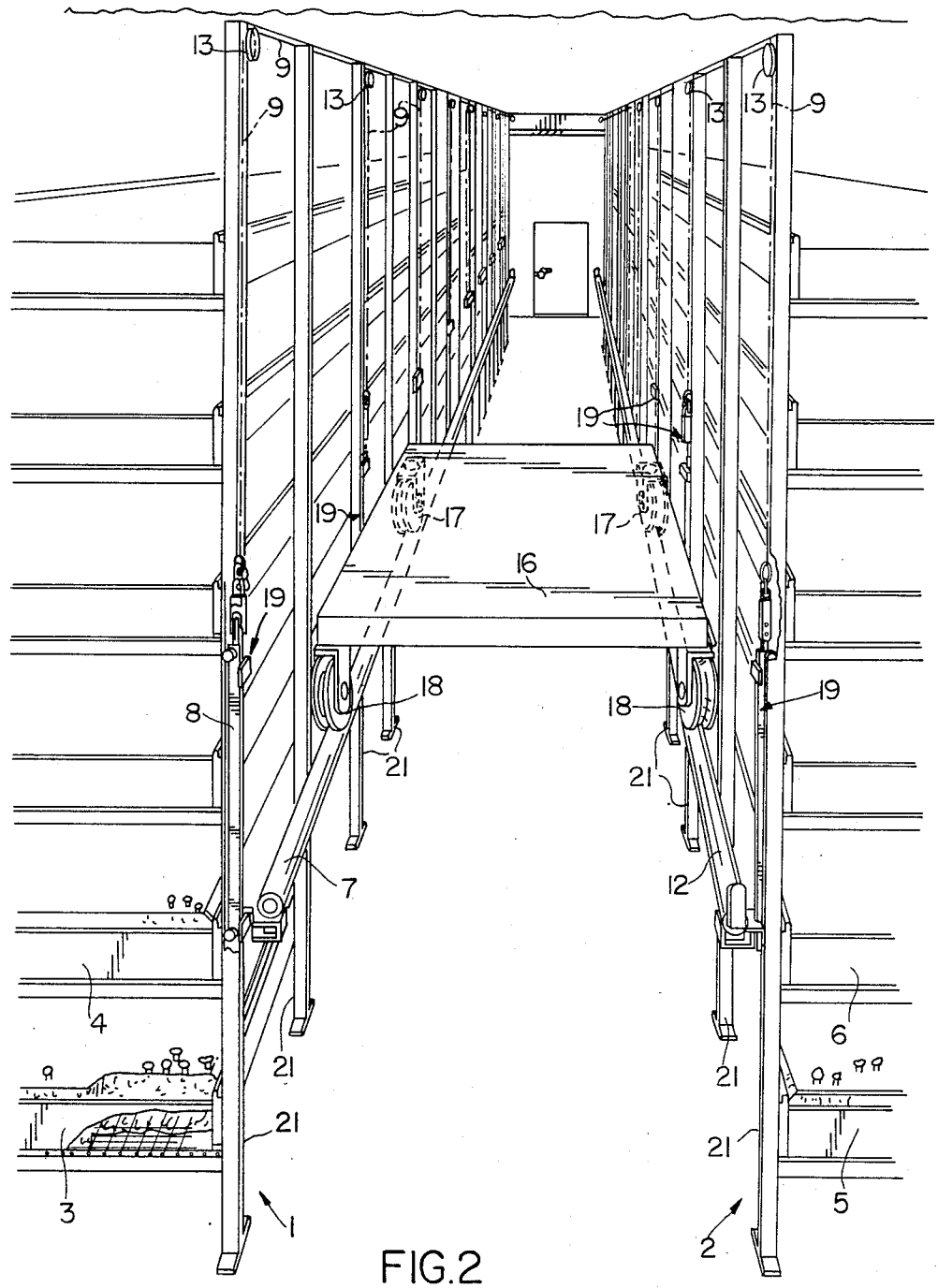
FIG. 2 is a perspective view into the apparatus according to the invention with two racks disposed facing each other.
Figure 3:
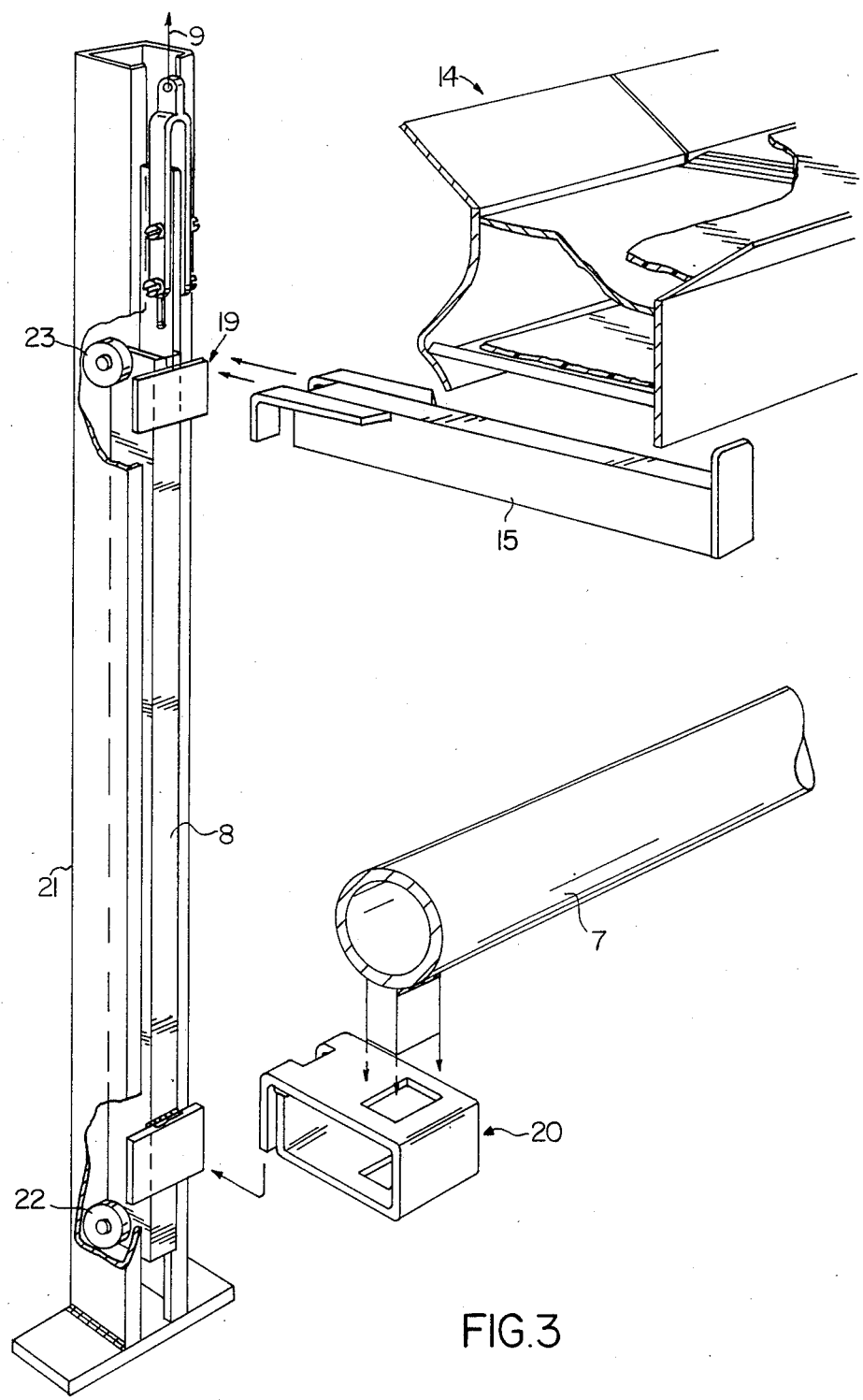
FIG. 3 is a detail in perspective view of the construction according to the invention.

The apparatus for cultivating mushrooms comprises a building 100 in which the required climate is maintained with conventional means. Arranged parallel to each other in the building are racks 1, 2. Positioned at a vertical interval from one another in the racks are horizontal trays 3, 4, 5 and 6 into which soil for cultivating mushrooms is placed. Disposed horizontally along rack 1 for instance is a guiding 7, which is vertically movable with the guide part 8 in the beam 21 along rack 1. The guiding 7 can be moved in vertical direction via the motor 10 and cable 9. Arranged on rack 2 is a similar guiding 12 which can be moved synchronously with guiding 7. A frame consisting of two parts 15, 19 is connected for movement with the guiding 7 for supporting the belt conveyor 14. The latter therefore moves synchronously with guiding 7. On guidings 7 and 12 a work platform 16 can be placed which supports on the guiding via swivel castors 17 and rigid castors 18. Guiding 7 is releasably connected to frame part 19 via a coupling piece 20. Frame part 19 is movable in the vertically disposed U-shaped beam 21 using wheels 22, 23. Frame part 19 is connected with the cable 9 of drive means 10.

During operation the personnel takes up position on work platform 16 which can be placed as required at the desired height along the rack by means of the drive motor 10. The personnel can gain access to the to be harvested mushrooms from the trays in easy and safe manner and place them on the belt conveyor 14, using which they are carried away.

What is claimed is:

1. Apparatus for cultivating market garden products such as mushrooms, which comprises the combination of:
   a building defining a space within which a desired climate is maintained;
   a pair of horizontally spaced and opposed racks, each including horizontal trays disposed in vertically spaced relation and adapted to contain soil for growing the product;
   a work platform of a length which is small compared with the length of the racks;
   horizontal guide means for traveling the work platform back and forth along the racks, there being one horizontal guide means along each rack and the two horizontal guide means being in spaced opposition to each other;
   vertical guide means spaced lengthwise along the racks; and
   the horizontal guide means being engaged with the vertical guide means for guiding the horizontal guide means vertically.

2. Apparatus as defined in claim 1 including a frame carried by the horizontal guide means for supporting a belt conveyer.

3. Apparatus as defined in claim 2 including drive means for raising and lowering the horizontal guide means synchronously.

4. Apparatus as defined in claim 1 wherein the drive means includes pulleys and cables trained over the pulleys.

5. Apparatus as defined in claim 1 wherein the vertical guide means comprise vertically extending U-shaped beams and each horizontal guide means includes a horizontal rail, frame portions guided in the vertically extending beams and coupling means for detachably coupling the rail to the frame portions.

6. Apparatus as defined in claim 2 wherein the vertical guide means comprise vertically extending U-shaped beams and each horizontal guide means includes a horizontal rail, frame portions guided in the vertically extending beams and coupling means for detachably coupling the rail to the frame portions.

7. Apparatus as defined in claim 3 wherein the vertical guide means comprise vertically extending U-shaped beams and each horizontal guide means includes a horizontal rail, frame portions guided in the vertically extending beams and coupling means for detachably coupling the rail to the frame portions.

8. Apparatus as defined in claim 4 wherein the vertical guide means comprise vertically extending U-shaped beams and each horizontal guide means includes a horizontal rail, frame portions guided in the vertically extending beams and coupling means for detachably coupling the rail to the frame portions.

9. Apparatus as defined in claim 5 wherein the frame parts bear via rollers on the inside of the vertical beams.

10. Apparatus for cultivating market garden products such as mushrooms, which comprises the combination of:
 a building defining a corridor within which a desired growing climate is maintained;
 vertically spaced growing means along the opposite sides of the corridor;
 a work platform of a width commensurate with the width of the corridor and of a length which is small compared with the length of the corridor;
 horizontal guide means along each side of the corridor for traveling the work platform back and forth along the corridor for access to the growing means on either side of the corridor;
 means for vertically adjusting the height of the horizontal guide means and the work platform; and
 horizontally extending conveyer means carried by the horizontal guide means for providing a product transport above the work platform.

11. Apparatus as defined in claim 10 wherein the horizontal guide means includes vertically extending frame portions, guide rails carried by lower ends of the frame portions and cantilever support means for the conveyer means and carried by upper ends of the frame portions along one side of the corridor.

* * * * *